United States Patent [19]

Barton

[11] Patent Number: 4,622,609
[45] Date of Patent: Nov. 11, 1986

[54] READ/WRITE HEAD POSITIONING APPARATUS

[76] Inventor: Richard E. Barton, 187 Kent St., Scituate, Mass. 02066

[21] Appl. No.: 607,192

[22] Filed: May 4, 1984

[51] Int. Cl.$^4$ .................. G11B 5/55; G11B 21/08
[52] U.S. Cl. .................................................. 360/106
[58] Field of Search ................................ 360/97–99, 360/106; 310/12–13

[56] References Cited

U.S. PATENT DOCUMENTS

| Re. 27,289 | 2/1972 | Sawyer. | |
|---|---|---|---|
| Re. 27,436 | 7/1972 | Sawyer. | |
| 3,543,060 | 11/1970 | Holmes. | |
| 3,656,015 | 4/1972 | Gillum | 310/13 |
| 3,666,977 | 5/1972 | Helms | 310/13 |
| 3,869,625 | 3/1975 | Sawyer. | |
| 4,215,283 | 7/1980 | Hinds. | |
| 4,286,180 | 8/1981 | Langley | 310/12 |
| 4,344,022 | 8/1982 | Heide | 310/12 X |

FOREIGN PATENT DOCUMENTS

| 4995 | 10/1979 | European Pat. Off.. |
| 38-11113 | 6/1963 | Japan. |
| 55-10840 | 1/1980 | Japan. |
| 55-18897 | 2/1980 | Japan. |
| 1135765 | 12/1968 | United Kingdom. |

Primary Examiner—A. J. Heinz

[57] ABSTRACT

An apparatus for positioning the sets of read/write heads of an information storage disk that is a completely sealed unit with its own connecting cable and mounting apparatus. The apparatus includes a carrier connected through a slot in the sidewall of a tubular stator to a cylindrical armature. The carrier is driven axially along the outside of the stator as the armature moves axially inside the stator to position sets of read/write heads that may be attached to the carrier in their desired position with respect to an information storage disk. The armature is connected to the carrier by pins. The surface of the carrier facing the stator has a concave contour to match the exterior surface of the stator and extends beyond the stator slot a sufficient amount to completely close the stator slot no matter what the axial position of the carrier. A projection extends from the concave surface of the carrier into the slot, and the lateral edges of the projection form bumpers for the carrier. The armature and carrier are slotted to provide easy access for armature wiring which extends through the carrier and connects to a cable connected to the carrier at a point spaced apart from the stator.

19 Claims, 6 Drawing Figures

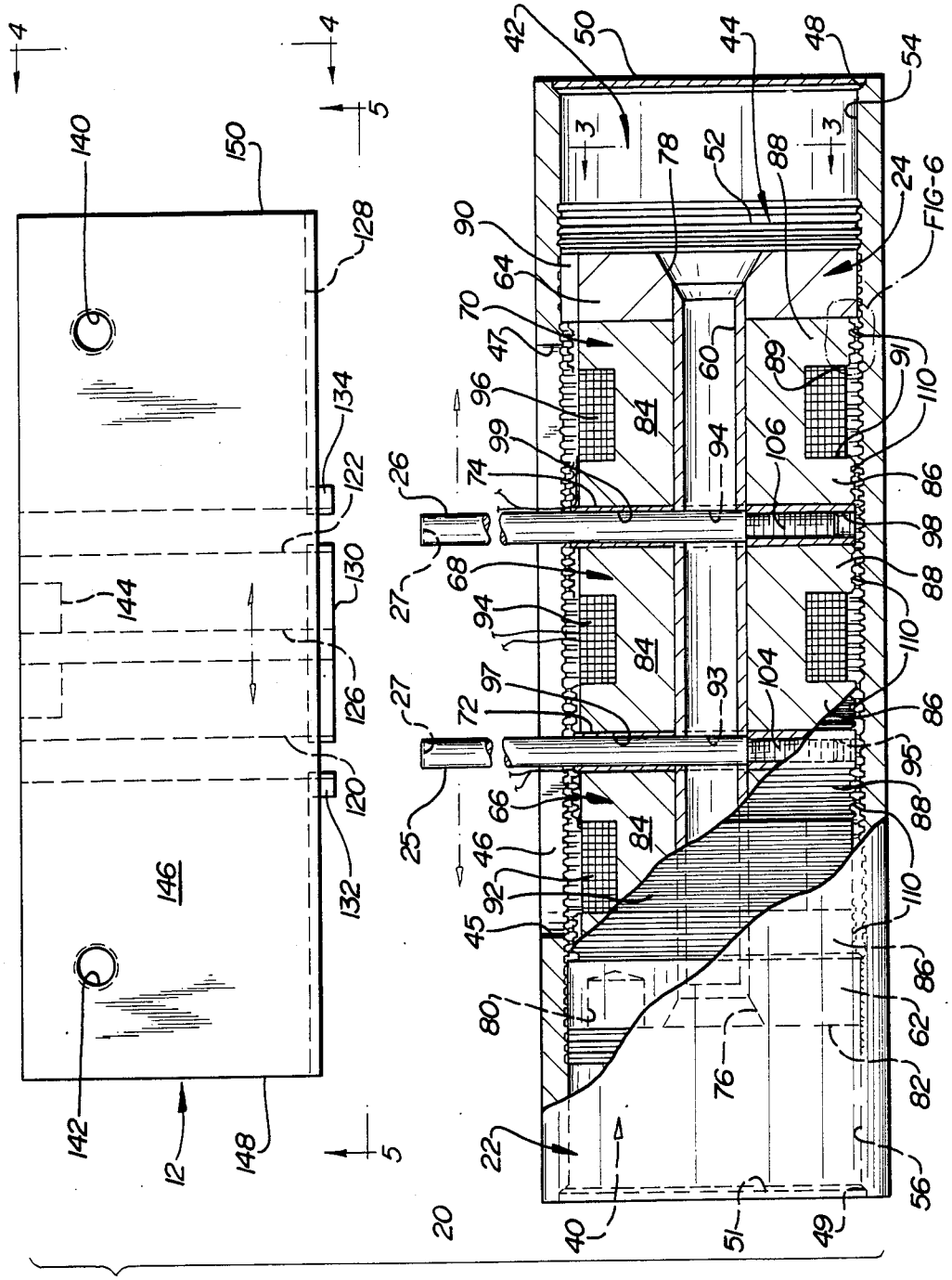

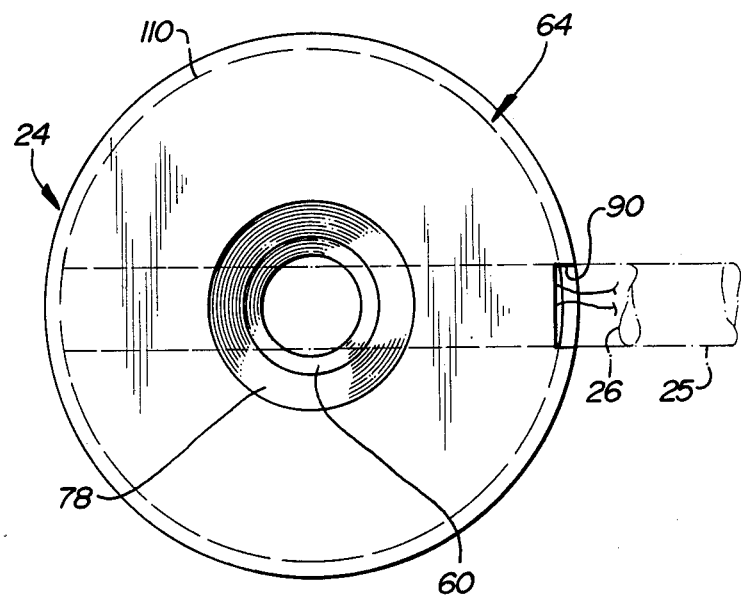
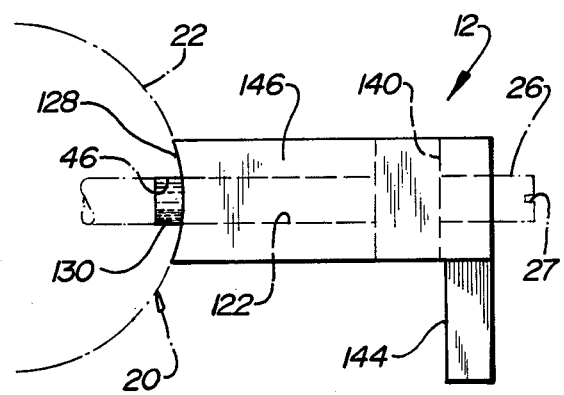
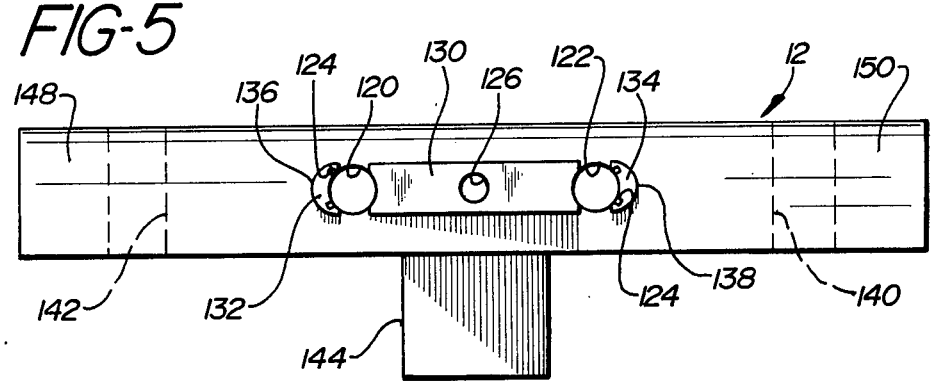

4,622,609

READ/WRITE HEAD POSITIONING APPARATUS

BACKGROUND OF THE INVENTION

The present invention relates to an apparatus for positioning the read/write head of an information storage disk and, more particularly, to a completely sealed unit with its own connecting cable and mounting apparatus.

The input and output systems of various computers, particularly the smaller desk-top computers that have received great popularity recently, use floppy disks as an information storage medium. Read/write heads are used to deposit information on the disks and to read information from the disks. In order to maximize the information storage capability of the disks and the accuracy of the read/write functions, it is important to precisely and reliably position the read/write head with respect to the information storage disks. The device should be lightweight and fast acting and, therefore, should avoid using permanent magnets as part of the drive mechanism. Since such devices are usually integrated into the computer systems with which they are used, it is important that they function reliably over long periods of time without substantial maintenance. It would be desirable to have a head-positioning apparatus which was a completely sealed unit and which was provided with its own mounting. It would also be desirable to have a single unit which was capable of driving more than one set of read/write heads at the same time. It is also important to have a head-positioning apparatus which is not likely to experience adverse thermal effects as a result of heat generated by the head-positioning apparatus itself or by surrounding apparatus within the computer system in which it is used. It would also be desirable to have a head-positioning apparatus which was equipped with its own electrical cables so that it could be easily integrated into the computer system with which it is used by merely plugging it into the appropriate connectors within the computer so as to avoid separate wiring.

SUMMARY OF THE INVENTION

The present invention provides an apparatus for positioning the read/write head of an information storage disk which is completely sealed with its own connecting cable and mounting apparatus. The apparatus is lightweight, fast acting, precise and reliable. The head-positioning apparatus includes a carrier which may be connected directly to one or two sets of read/write heads. The carrier is connected to an actuator which provides precise guidance control for the carrier. The actuator includes a closed tubular stator with an axial slot through a central portion of its sidewall and a cylindrical armature which moves within the stator to different selectable, axial positions. The armature is connected to the carrier through the slot in the sidewall of the stator by means of connecting pins. As the carrier and the armature move together, the carrier covers the stator slot to provide a completely sealed unit so that dust and dirt will not interfere with the action of the armature within the stator.

The armature includes a hollow mandrel on which are mounted a pair of sliding bearings which provide pitch, yaw, heave and sway controls for the motion of the armature within the stator. Pitch is defined as rotation of the axis of the armature in the vertical plane. Yaw is rotation of the armature axis in the horizontal plane. Heave is translation of the armature axis up and down in the vertical plane, and sway is translation of the armature axis side-to-side in the horizontal plane. The connecting pins between the carrier and armature prevent the armature from rolling about the armature axis. The armature is free to translate in the axial direction. The armature also includes a plurality of spools each with a hub portion and two flanged portions. Electrical wires are wound around the hub portions of each spool. Each spool of wires may be energized in desired sequence to create a magnetic field within its associated spool, across the space or gap between the armature and stator and along the confronting portion of the stator to form a torroidal magnetic field.

The armature is positioned relative to the stator by the use of grooves placed in confronting cooperating relationship on the interior wall surface of the stator and on the circumferential surfaces of the spool flanges. The grooves on the stator and the armature spools have the same pitch, but adjacent spools have a lead advance so that the grooves on only one spool at a time line up with the corresponding grooves on the stator. By selectably energizing different spools in desired sequence, one can cause the armature to move to distinct axial positions within the stator and, thus, to move the carrier to which the armature is connected.

The radius of the armature bearings is slightly greater than the radius of the flanged portions of the spools so that only the bearings directly contact the grooved interior wall of the stator. An axially-extending channel slot is provided on the circumference of the armature to provide a means of assembling the spools and their wiring into the stator without damaging the spool wiring. Non-ferromagnetic spacers are provided between adjacent spools to isolate the magnetic field of each spool. Although the diameter of each spacer is preferably the same as the spools and less than the diameter of the bearings, the spacer diameter could be the same as that of the bearings to provide additional bearing surface for guiding the armature within the stator. A hole is drilled and tapped into each spacer to accommodate a pin which extends radially out of the armature through the slot in the sidewall of the stator and into bores provided in the carrier. The pin bores in the carrier have channels extending along their interior walls to provide egress for spool wiring out through the carrier so they can be connected to an electrical cable connected to the carrier by means of a cover plate. The wiring on individual spools are intermittently actuated to provide a magnetic field within that spool to align the grooves on that spool with the grooves on the interior wall of the stator. The materials and sizes of the armature and the stator are chosen so that thermal expansion that may be generated by the armature coils will not cause the armature to bind within the stator.

The armature mandrel is a hollow tube so that the mandrel can be used as a jig on which to assemble the armature parts.

The surface of the carrier which adjoins the stator has a concave curve mating with the curved surface of the tubular stator. The concave surface of the carrier has a projection which extends into the slot in the sidewall of the stator. The lateral edges of the projection provide bumpers for stopping the carrier against the interior lateral edges of the stator slot. The pin bores in the carrier extend through the projection in the concave face of the carrier at a point laterally inward from the bumper edges of the projection so that the coil wires will not be damaged when the carrier stops against the interior surface of the slot.

The cross-section of the grooves on the interior wall of the stator and on the circumference of the spool flanges is generally trapezoidal with the larger bases of the stator and armature grooves facing one another.

The actuator and carrier of the present invention are provided with a mount having a base with a cradle on the base for receiving the actuator. The mount for the stator and carrier is provided with walls and tabs to provide a means for attaching the mount to supporting structure. Alternatively, the mount may be omitted and the actuator may be directly mounted to the computer with which it is used.

DESCRIPTION OF THE DRAWINGS

These and other features and advantages of the present invention will be more fully understood from the following detailed description taken in conjunction with the accompanying drawings in which:

FIG. 2 shows a partial plan view shown partially in section of certain components of the apparatus shown in FIG. 1;

FIG. 3 shows a partial end view of the apparatus of FIG. 2 taken along lines 3—3 in FIG. 2;

FIG. 4 shows an end view of part of the apparatus of FIG. 2 taken along lines 4—4 in FIG. 2;

FIG. 5 shows an elevational view of part of the elements shown in FIG. 2 taken along lines 5—5 in FIG. 2; and, FIG. 6 shows a detail of the apparatus of FIG. 2.

DETAILED DESCRIPTION OF THE PREFERRED EMBODIMENT

Figure 1:
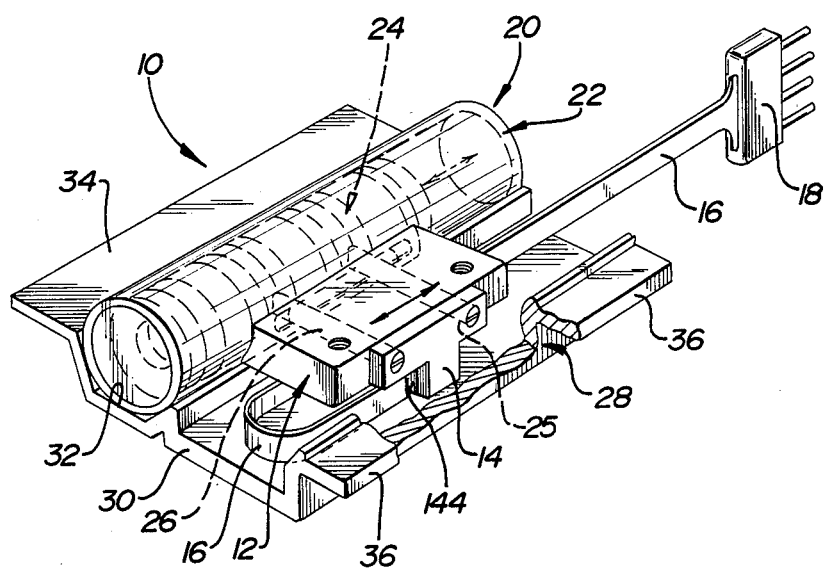
FIG. 1 shows a perspective view of the head-positioning apparatus of the present invention.

Referring now to FIG. 1 there is shown the head-positioning apparatus 10 of the present invention. Head-positioning apparatus 10 includes a plastic carrier 12 to which one or two sets of read/write heads (not shown) of a floppy disk can be connected. A plastic end plate 14 on carrier 12 covers one end of flexible connector cable 16. The other end of cable 16 mates with connector plug 18 and is adapted for suitable connection into a power source (not shown) associated with the apparatus with which head-positioning apparatus 10 is used.

Carrier 12 is driven by a actuator 20 which includes a stator 22 and an armature 24.

As will be explained in further detail later in the application, armature 24 is carefully guided to prevent pitch, yaw, heave and sway and to permit armature 24 to move axially along the inside of stator 22 among a variety of discrete positions. Pins 25 and 26, affixed to armature 24, extend through a slot 46 (see FIG. 2) in the sidewall of armature 22 and into engagement with carrier 12 so that armature 24 and carrier 12 move together. Pins 25 and 26 keep armature 24 from rotating within stator 22.

Actuator 20 and carrier 12 may be supported on optional mounting 28 which includes a base portion 30, a channel portion 32 in which actuator 20 is cradled. Tabs 34 and 36 extend from base portion 30 and channel portion 32, respectively, to provide a means for connecting head positioning apparatus 10 to supporting structure (not shown). Mount 28 is preferably made of aluminum. Alternatively, actuator 20 may be directly attached to the hardware with which it is used.

Referring now to FIG. 2, the individual components of head-positioner 10 will be described in greater detail.

Actuator 20 includes a tubular stator 22 having open ends 40 and 42 and a surrounding circumferential wall 41 with an interior wall surface 44. Stator 22 has a slot 46 extending through wall 41 and extending axially along a central portion of stator 22. Open ends 40 and 42 of stator 22 each have a recess 48 and 49 for respectively receiving covers 50 and 51 which may be glued or otherwise fixed in recesses 48 and 49 to provide a tight seal for open ends 40 and 42.

Extending along interior wall surface 44 of tubular stator 22 are a series of grooves 52 spaced at a regular pitch. Each groove 52 extends circumferentially about interior wall surface 44 of tubular stator 22, except in the area of slot 46 where grooves 52 stop on one side of the slot 46 and start again on the other side of slot 46. Each circumferentially extending groove 52 defines a plane which is preferably perpendicular to the axis of tubular stator 22. In the preferred embodiment, each groove 52 has a generally trapezoidal cross-section with a base angle of approximately 70°. This angle may be varied, for example, between 50° and 90°, but a 70° angle makes machining of the grooves easier. The smaller base of groove 52 is aligned parallel to the axis of stator 22 and radially outwardly of the larger base of groove 52 so as to form a valley 58. The material left between interior wall surface 44 adjacent grooves 52 will be referred to as the crest 57 of groove 52 (see FIG. 6).

Figure 6:
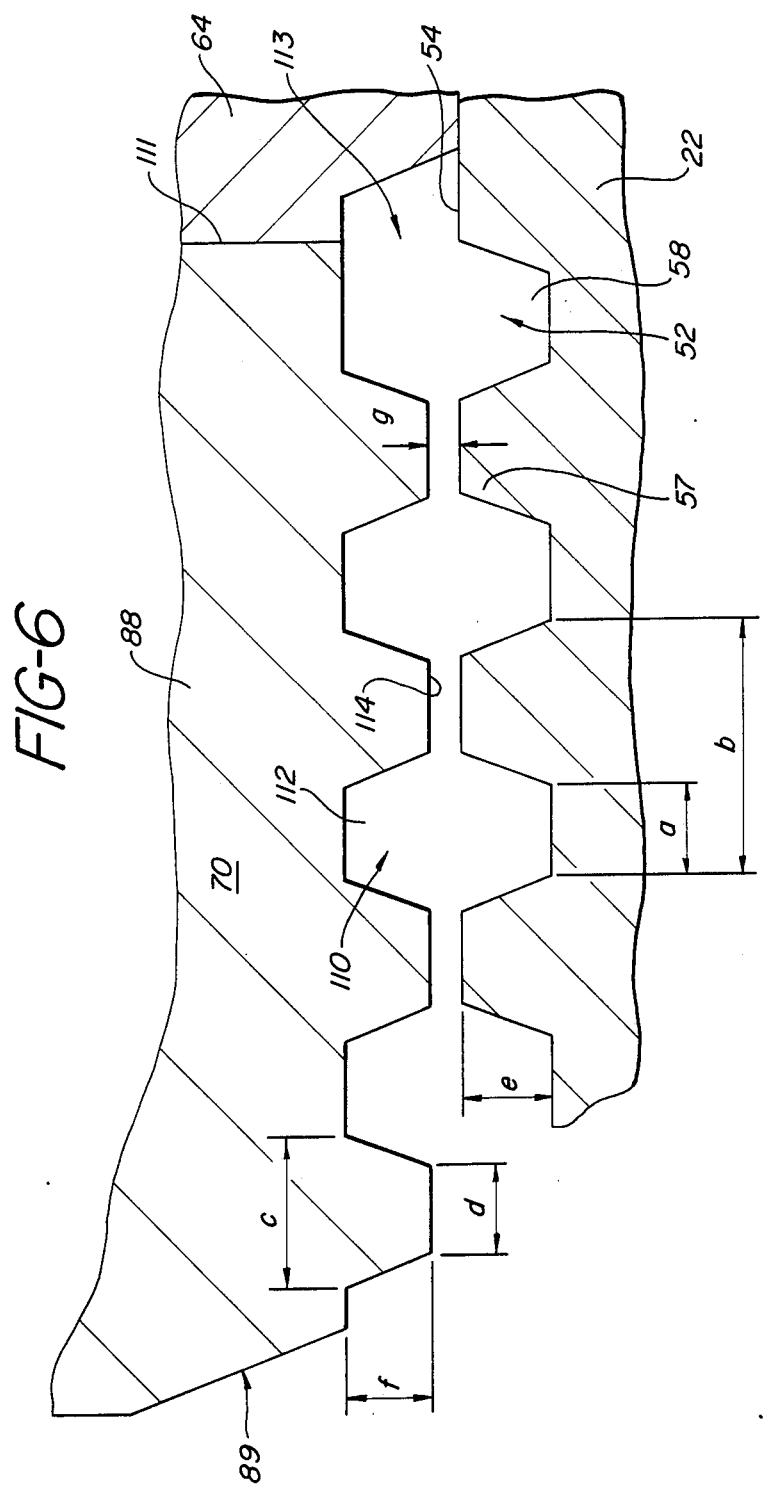

In the preferred embodiment, the dimension of the small side of the trapezoidal groove 52 is approximately 0.008 inches, see reference "a" in FIG. 6, the pitch or spacing between grooves is approximately 0.0214286 inches, see reference "b" in FIG. 6, and the radial depth of valley 58 is 0.0075 inches, see reference "e" in FIG. 6. Referring again to FIG. 2, there is a flat portion 54 extending from open end 42 a predetermined distance along interior wall surface 44 of stator 22. There is another flat portion 56 extending a similar predetermined distance in from open end 40 along interior wall surface 44. Slot 46 is spaced approximately equidistantly from the respective borders between flat portions 54 and 56 and grooves 52. Flat portions 54 and 56 are optional. The entire interior wall surface 44 can contain grooves 52.

Stator 22 is made of a material with a good magnetic permeability and good machinability, preferably annealed C-1214L FM steel electroplated with 25 to 50 microns of chrome.

Still referring to FIG. 2, there is shown armature 24 within stator 22 so that the relationship of armature 24 and stator 22 may be shown with respect to one another.

Armature 24 includes a tubular mandrel 60 aligned along its axis with sliding bearings 62 and 64 mounted on each end. In this preferred embodiment, there are three spools 66, 68 and 70 mounted between bearings 62 and 64. Each of spools 66, 68 and 70 includes a hub portion 84 coaxially aligned with mandrel 60 and flange portions 86 and 88 also coaxially aligned with mandrel 60. A spacer 72 is placed between spools 66 and 68 and a second spacer 74 is placed between spools 68 and 70. Bearings 62 and 64, spools 66, 68 and 70 and spacers 72 and 74 are assembled onto mandrel 60. Hollow mandrel 60 is used as a jig onto which the spools, spacers and bearings are assembled.

Each piece is soldered to mandrel 60 and to each other using 60 pb/40 sn solder. Countersunk holes 76 and 78 are drilled, respectively, into bearings 62 and 64.

The diameter of bearings 62 and 64 is greater than the diameter of flange portions 86 and 88 of spools 66, 68 and 70 so that bearings 62 and 64 ride directly along interior wall surface 44 of stator 22. The diameter of spacers 72 and 74 preferably equal to the diameter of flanges 86 and 88. Alternatively, spacers 72 and 74 can be made of a bearing material with a diameter equal to that of bearings 62 and 64 to provide additional guidance for armature 24 within stator 22.

An axial bore 80 is drilled in the surface 82 of bearing 62 and spaced radially apart from the center line of mandrel 60. A pin (not shown) is inserted in bore 80 (otherwise known as a dog hole) to rotate armature 24 during the cutting of grooves 110 on flanges 86 and 88, as will be explained later in this application. Placing dog hole or bore 80 on end surface 82 of armature 24 permits grooves 110 to be cut on the entire circumference of flanges 86 and 88. Conventional dogs are clamped about circumference of a piece which is to be machined, and it can interfere with the surface machining.

An axially extending access channel 90 is cut along the circumferential surface of bearing 64 and the flange portions 86 and 88 of spool 70, across spacer 74, across flanges 86 and 88 of spool 68, across spacer 72 and across flange 88 of spool 66. Channel 90 communicates with the annular space 92 defined between the confronting surfaces of flanges 86 and 88 and hub 84 of spool 66. Channel 90 need not extend across flange 86 of spool 66 nor across the surface of bearing 62. The hub portion 84 and the confronting surfaces of flanges 86 and 88 of spools 66, 68 and 70 are all painted with an insulating paint. Hub 84 of spool 66 is wound with approximately 425 turns of #36HPE red magnet wire, hub 84 of spool 68 is wound similarly with green wire, and hub 84 of spool 70 is wound similarly with amber wire. Channel 90 provides a means for assembling armature 24 into stator 22 without damaging the wiring for the spools as will be explained subsequently in the application.

Spacers 72 and 74 each have bores 93 and 94, respectively, cut diametrically across the respective spacer and through mandrel 60. One portion 95 of bore 93 extending from mandrel 60 radially outwardly to the circumferential edge of spacer 72 is threaded, and the remaining portion 97 of bore 93 has a clearance bore for receiving pin 25. Bore 94 of spacer 74 has similar threaded and clearance portions 98 and 99, respectively, for receiving pin 26. One end 104 of pin 25 has corresponding threads for threading into bore 93, and the remaining portion projects out through clearance portion of bore 93 and through slot 46 of stator 22 and into carrier 12. Pin 26 has a similar threaded portion 106 and similarly extends out of spacer 74, through slot 46 and into carrier 12. Pins 25 and 26 prevent armature from rotating within stator 22. Slots 27 on the end of pins 25 and 26 accept a screw driver for tightening pins 25 and 26 into place.

Flange portions 86 and 88 of each of spools 66, 68 and 70 have grooves 110 cut in their outer circumferential surface. As with grooves 52, each of grooves 110 on the flange portions of the spools has a generally trapezoidal cross-section with approximately 70° base angle and a 0.008 inch small base or valley 112, dimension "c" in FIG. 6, a 0.008 inch crest portion 114, dimension "d" in FIG. 6, and a radial depth of valley 112 of 0.0075 inches, dimension "f" in FIG. 6. Each groove 110 extends circumferentially around each flange portion except for that area where channel 90 extends. Each groove 110 defines a plane which is preferably perpendicular to the axis of armature 24. Grooves 110 on flanges 86 and 88 of spool 70 are spaced at the same regular pitch as stator grooves 52. Grooves 110 on flanges 86 and 88 of spool 68 are also spaced at the same regular pitch as grooves 110 on spool 70 but have a lead advance of ⅓ of a pitch. Grooves 110 on flange portions 86 and 88 of spool 66 are also spaced at the same regular pitch as the other spools 68 and 70 but have a further lead advance of ⅓ of a pitch.

Spools 66, 68 and 70 are each made of a material having a good magnetic permeability and good machinability like C-1214 FM steel. Bearings 62 and 64 are made of a material having a low magnetic permeability like 932 bronze. Spacers 72 and 74 are made of a low magnetic permeability material like brass, as are mandrel 60 and pins 25 and 26. Alternatively as previously discussed, spacers 72 and 74 can be made of 932 bronze and have a diameter equal to bearings 62 and 64 to provide additional bearings to guide armature 24 within stator 22.

The depth of each groove 110 is approximately 0.0075" radially inward from the circumferential surface of flanges 86 and 88 of each of the spools 66, 68 and 70. The groove on flange 88 of spool 70 adjacent bearing 64 is wider than the standard 0.008" and extends across the interface 111 between spool 70 and bearing 64 to form a wider trapezoidal groove. This recesses bearing/spool interface 111 to assure that the bearing surface of bearing 62 and 64 are all brass and that they do not include solder from the joint between the bearing and the adjacent spool or steel from the spool.

As shown in FIG. 6, the edge 89 of flange 88 on spool 70 adjacent hub portion 84 is cut deeper into flange portion 88 to provide a chamfered surface for edge 89. The corresponding edge 91 of flange 86 adjacent hub portion 84 of spool 70 is also chamfered in similar fashion. This chamferring is used on the similar edges of spools 68 and 66. This chamfering makes it easier to wind the coil wires on hubs 84 of spools 66, 68 and 70 so that the wires are not nicked or damaged by sharp edges on flanges 86 and 88.

Still referring to FIG. 2, there is shown a top view of carrier 12 with holes 120 and 122 for receiving pins 25 and 26, respectively.

Referring now to FIG. 5, it can be seen that each of holes 120 and 122 has channels 124 in the wall of hole 120 to provide egress for the wires from spools 66 and 70, respectively. A third hole 126, located between holes 120 and 122, provides egress for the electrical wires from spool 68.

Referring now to FIG. 4, it can be seen that surface 128 of carrier 12 facing stator 22 is concave and has the same curvature as the sidewall of stator 22. Projection 130 in the center of concave surface 128 extends into slot 46 in the sidewall of stator 22 and forms a clearance fit with slot 46. Holes 120 and 122 project through projection 130. The lateral bumpers 132 and 134 of projection 130 extend outside holes 120 and 122, respectively, and have rounded surfaces 136 and 138 with a radius conforming to the ends 45 and 47 of slot 46. Lateral bumpers 132 and 134 provide a positive stop for the axial motion of carrier 12 with armature 24. Channels 124 and holes 120 and 122 are inside the ends of lateral bumpers 132 and 134 so that the electrical wires from spools 66 and 70 are protected from damage when carrier 12 stops against the ends 45 and 47 of slot 46.

Mounting holes 140 and 142 are provided to mount carrier 12 to the sets of read/write heads (not shown) with which the present invention is used. One set of heads may be mounted on each side of carrier 12 or carrier 12 may support only one set of heads.

Referring again to FIG. 4, carrier 12 has a body portion 146 from which a leg 144 extends. Leg 144, as shown in FIG. 1, provides a surface against which cable 16 may be clamped by cover plate 14. Preferably leg 144 does not touch base 30, but it can touch base 30 if desired. Carrier 12 has a body portion 146 from which leg 144 extends. Referring again to FIG. 2, it can be seen that the end portions 148 and 150 of body 146 of carrier 12 extend beyond the edges of slot 46 so that as armature 24 slides from one position to another, end portions 148 and 150 keep a sealing engagement with the sidewall of stator 22, always covering slot 46 to provide a seal to protect armature 24 from damage by dust or dirt.

Referring again to FIG. 2, it can be seen that the circumferential surfaces of bearings 62 and 64 ride directly on flat portions 54 and 56 of the interior wall surface 44 of stator 22 and also directly on crests 57 of grooves 52 on the interior wall surface 44 of stator 22. Since the diameter of bearings 62 and 64 are greater than the diameter of the rest of armature 24, bearings 62 and 64 provide bearing support for armature 24 as it moves along the interior wall surface 44 of stator 22. Bearings 62 and 64 provide good guidance for armature 24 within stator 22 by controlling pitch, yaw, heave and sway. Pins 25 and 26 extending from armature 24 through slot 46 into carrier 12 prevent armature 24 from rotating, but projection 130 on concave face 128 of carrier 12 provides substantially no bearing support for the axial motion of armature 24. Thus, the present invention provides a completely sealed head-positioning apparatus 10 without any additional structure protruding through the stator walls to provide supplemental bearing mechanisms to facilitate the motion of armature 24.

End plate 14 covers the ends of holes 120, 122 and 126 and sandwiches a connector cable 16 between plate 14 and carrier body 146 and leg 144. Carrier 12 is made of plastic like polycarbonate. Cover 14 is made of Delrin plastic. Cable 16 is an etch cable, which is a sheet of copper sandwiched between two sheets of polyimide film or some other high temperature film. The copper is etched to provide electrical connections for the wires coming through carrier body 146 from spools 66, 68 and 70. Connector cable 16 is sufficiently flexible to move with carrier 12 without providing appreciable drag on carrier 12.

In FIG. 2, the assembly of carrier 12, pins 25 and 26, armature 24 and stator 22 can be observed. The coil wires for spools 66, 68 and 70 are laid into channel 90, and armature 24 is slid into stator 22. Armature 24 is rotated so that the coil wires can be drawn out through slot 46. Pins 25 and 26 are then inserted into bores 93 and 94 of spacers 72 and 74 through slot 46 and tightened into place by means of a screw driver (not shown) placed in slot 27 on the end of pins 25 and 26. The coil wires from spool 66 are inserted through carrier bore 120 and into channels 124 in bore 120. Coil wires for spool 66 are inserted through carrier bore 126. Coil wires for spool 76 are inserted through bore 122 and into channels 124 in bore 122. Carrier 12 is then slid onto pins 24 and 26 so that projection 130 slides into slot 46, and concave surface 128 closely conforms to the outside of stator 22. The coil wires are connected to cable 18, and end plate 14 is put in place to complete the assembly.

The assembled actuator 20, carrier 12 and cable 16 can then be placed in mounting 28, and sets of read/write heads (not shown) may be attached to carrier 12.

The operation of actuator 20 and specifically the movement of armature 24 within stator 22 can also be observed from FIG. 2 and FIG. 6. The radius of bearings 62 and 64 is slightly greater, about 0.002 inches greater (dimension "g" in FIG. 6), than the radius of crest 114 of grooves 110 on flanges 86 and 88 of spools 66, 68 and 70. Bearings 62 and 64 will thus ride directly on flat surfaces 54 and 56 and crests 57 of grooves 52 on interior wall surface 44 of stator 22. Bearings 62 and 64 maintain a minimum gap between crests 57 of grooves 52 and crests 114 of grooves 110. The space between valley 58 of grooves 52 and valley 112 of grooves 110 will be greater than the gap between crests 57 and 114. Thus, when the windings about the hub portions of one of spools 66, 68 or 70 are energized, the flux from the resulting magnetic field will pass from hub 84 through flange 84 and 86 to stator 22 at the smaller gap between crests 57 and 114 because that is the lower reluctance path. The larger space between valleys 58 and 112 will provide a larger reluctance path and cause the flux to concentrate in the area of crests 57 and 114. Since spools 66, 68 and 70 and stator 22 are made of a material which has a high magnetic permeability and the adjacent bearings and spacers have a low magnetic permeability, most of the flux from the energized spool will be confined to that spool and the immediately adjacent portion of stator 22.

If the crests 114 of spool 66 are not aligned with crests 57 of stator 22 when spool 66 is energized, the flux of the resulting magnetic field will align crests 57 and 114. It is now apparent that the lead advance between adjacent spools will cause each spool to be aligned at a discrete axial position with respect to stator 22. Thus, by energizing spools 66, 68 and 70 in sequence, armature 24 may be advanced along stator 22 in discrete axial steps.

Bearings 62 and 64 have been designed to provide a smooth sliding action of armature 24 along the interior wall surface 44 of stator 22 both in the area of flats 54 and 56 and of crests 57 of grooves 52. In the preferred embodiment, the difference in diameters of bearings 62 and 64 and interior wall surface 44 is from 0.0002 to, 0.0004 inches. This clearance must be as small as possible so that smooth sliding action will be achieved but large enough to account for thermal expansion of bearings 62 and 64 due to heat that may be generated when armature 24 is energized. If this clearance is too small, thermal expansion could cause binding. If this clearance is too large, the clearance space will become eccentric, i.e., the space between bearings 62 and 64 and interior surface wall 44 could be zero on one side and twice the concentric gap on the other side. This eccentricity could cause side loads when the armature 24 is energized, which would in turn cause friction to increase and actuator accuracy to decrease.

In operation, connector plug 18 is connected to a suitable source of electrical energy (not shown) to selectively energize the coil wires of spools 66, 68 or 70 so as to create a magnetic field which will cause the crests 57 and 114 of grooves 52 and 110, respectively, to be aligned. Pins 25 and 26 connect armature 24 to carrier 12 so that it will move as a unit with armature 24. Projection 130 of carrier 12 projects with a clearance fit into slot 46 of stator 22 to help seal slot 46. End skirts 148 and 150 of carrier 12 cover slot 46 so as to protect armature 24 and the inside of stator 22 against dust and dirt.

The present invention provides a precise and reliable sealed positioning apparatus for the sets of read/write head of an information storage disk.

While the present invention has been described in connection with certain preferred embodiments, those skilled in the art will appreciate that certain modifications may be made without departing from the scope of the present invention. It is, therefore, not intended that the present invention be limited except as set forth in the following claims.

What is claimed:

1. Apparatus for controlling the position of a read/write head with respect to an information storage disk comprising:
    a carrier adapted for connection to said head;
    drive means for said carrier including:
        a generally tubular stator having a circumferential wall and an interior wall surface and said stator circumferential wall having an axial slot through a central portion thereof;
        a generally cylindrical armature disposed within said stator and having a circumferential surface;
        means associated with said armature for selectively inducing a magnetic field at different axial positions along said armature;
        portions of said circumferential surface of said armature adapted to concentrate said magnetic field;
        portions of said interior wall surface of said stator adapted to concentrate said magnetic field;
        said field concentrating surface portions cooperating to position said armature with respect to said stator at selected axial positions;
        guidance means for said armature disposed completely within said drive means to control pitch, yaw, heave and sway of said armature while permitting free axial motion of said armature within said stator;
        said guidance means including at least two sliding bearings spaced axially apart on said armature and each haing a circumferential bearing surface sliding directly on a portion of said interior wall surface of said stator; and,
        connecting means connected to said armature and said carrier and extending through said stator slot to couple said armature and said carrier together.

2. The apparatus of claim 1 wherein said armature includes an axially extending mandrel having a first and second end;
    said guidance means including first and second generally annular bearing means disposed respectively on said first and second ends of said mandrel and each having a first radius;
    a plurality of generally annular spools mounted on said mandrel and made of a material having a good magnetic permeability;
    generally annular spacers mounted on said mandrel between adjacent spools and made of a material having a low magnetic permeability;
    each of said spools having a hub portion with a second radius less than the radius of said bearing portions and having flanged portions each having a third radius greater than the radius of said spool portion but slightly less than the radius of said bearing portions;
    the difference in radii between the hub portions and the flange portions of each spool providing an annular space to receive windings of electrically conductive wire which, when energized, will provide said magnetic field;
    a slot extending along the circumference of said armature from said first bearing into communication with said annular space on said spool most removed from said first bearing to provide recessed access for the electrical wires for the windings of all of said plurality of spools so that said wires will not interfere with the motion of said armature within said stator;
    each of said spacers having a diametric bore to receive said connecting means.

3. The apparatus of claim 2 wherein the diameter of said spacers is substantially equal to the diameter of said bearing means to provide additional guidance for said armature.

4. The apparatus of claim 2 wherein said connecting means includes pins and each of said spacer bores includes a threaded portion and one end of each of the said pins has a correspondingly threaded portion so that said pins may be threaded into engagement with said spacers.

5. The apparatus of claim 2 wherein the field concentrating portion of said interior wall surface of said stator includes a series of circumferential grooves spaced at a regular pitch along said interior wall surface.

6. The apparatus of claim 5 wherein said regularly spaced grooves are confined to a central portion of said interior wall surface of said stator and the areas of said interior wall surface from the ends of said central grooved area to the respective ends of the stator providing a smooth interior wall surface portion.

7. The armature of claim 6 wherein the cross-section of each of said stator and said armature grooves is trapezoidal having a base angle in the range of approximately 50° to 90°.

8. The apparatus of claim 6 wherein said armature moves from one position nearest the first end of the stator to a second position nearest the second end of the stator, said first bearing means moves from said smooth portion of said stator interior wall surface onto said central grooved portion of said stator interior wall surface,
    and said carrier having a sufficient lateral dimension to keep said stator slot covered no matter what axial position said armature is in.

9. The apparatus of claim 5 wherein the field concentrating portions of the circumferential surfaces of said armature are placed on said flanged portions of each spool and include grooves extending about the circumference of said flanged portions and spaced at the same regular pitch as said stator grooves,
    the grooves of adjacent spool having a lead advance whereby the grooves of only one spool will be aligned with said stator grooves at one time to provide the discrete positioning of the armature with respect to the stator.

10. The apparatus of claim 9 wherein the grooves on the flanged portions of the spools adjacent the bearing means extend across the interface between said flanged portion and said adjacent bearing means.

11. The apparatus of claim 1 wherein said stator includes first nd second open ends, said open ends having recessed grooves circumferentially thereabout; and,
covers adjacent to fit into said recessed grooves in the open ends of said stator to close said stator.

12. The apparatus of claim 1 further including mounting means for said stator having a base and a cradle on said base for receiving said stator;
said carrier having a body portion and a leg extending from said carrier body.

13. The apparatus of claim 12 wherein said cradle includes an open trough having sides arranged at angles to confine said stator.

14. The apparatus of claim 12 wherein said mounting means includes a wall extending from said base outside of said cradle and a tab extending from said wall, said wall and said tab providing a means for attaching said mounting means to supporting structure.

15. Apparatus for controlling the position of a read/write head with respect to an information storage disk comprising:
a carrier adapted for connection to said head;
drive means for said carrier including:
a generally tubular stator having a circumferential wall and an interior wall surface and said stator circumferential wall having an axial slot through a cental portion thereof;
a generally cylindrical armature disposed within said stator and having a circumferential surface;
means associated with said armature for selectively inducing a magnetic field at different axial positions along said armature;
portions of said circumferential surface of said armature adapted to concentrate said magnetic field;
portions of said interior wall surface of said stator adapted to concentrate said magnetic field;
said field concentrating surface portions cooperating to position said armature with respect to said stator at selected axial positions;
guidance means for said armature disposed completely within said drive means to control pitch, yaw, heave and sway of said armature while permitting free axial motion of said armature within said stator;
connecting means connected to said armature and said carrier and extending through said stator slot to couple said armature and said carrier together;
wherein said carrier has a concave surface confronting the exterior of said circumferential wall of said tubular stator and extending laterally across said carrier, said concave surface of said carrier having lateral edges;
a generally rectangular projection extending from said concave surface of said carrier and adapted to fit into said stator wall slot, said projection extending laterally only part way across said carrier and having lateral edges spaced inwardly from said lateral edges of said carrier;
the axial dimension of said slot being less than the lateral dimension of said carrier so that as said carrier moves back and forth in said slot under the influence of said armature, said slot is covered and sealed by the confronting, concave surface of the carrier.

16. The apparatus of claim 15 said slot having ends further including bosses on said lateral edges of said projection confronting the ends of said slot to act as bumpers for said projection against the ends of said slot.

17. The apparatus of claim 16 wherein said connecting means includes pins and said carrier includes bores for receiving said pin, each of said pin bores including recesses running axially along the walls thereof to provide access means for armature wires;
said pin bores extending through said carrier projection spaced inwardly from said projection lateral edge bosses so that said armature wires will be protected against damage when said bosses stop against the stator slot; and,
additional bores in said carrier equal in number to the number of armature spools in excess of the number of connecting means to provide further access for armature wires.

18. The apparatus of claim 17 further including cover means for covering the pin bores and the ends of the stator wiring.

19. The apparatus of claim 18 further including flexible cable means attached between said carrier and said cover for providing electrical input to said drive means.

* * * * *